United States Patent [19]

Kraus

[11] Patent Number: 4,491,038

[45] Date of Patent: Jan. 1, 1985

[54] TRACTION ROLLER TRANSMISSION

[75] Inventor: Charles E. Kraus, Austin, Tex.

[73] Assignee: Excelermatic Inc., Austin, Tex.

[21] Appl. No.: 408,421

[22] Filed: Aug. 16, 1982

[51] Int. Cl.³ .............................................. F16H 13/06
[52] U.S. Cl. ........................................ 74/798; 74/772;
74/209; 74/202
[58] Field of Search ................. 74/798, 202, 206, 214,
74/690, 721, 772, 209

[56] References Cited

U.S. PATENT DOCUMENTS

| | | | |
|---|---|---|---|
| 3,060,767 | 10/1962 | Parrett | 74/214 X |
| 3,478,623 | 11/1969 | Noguchi | 74/798 |
| 3,610,060 | 10/1971 | Hewko | 74/208 |
| 3,709,063 | 1/1973 | Moorhead | 74/798 X |
| 3,776,051 | 12/1973 | Kraus | 74/208 |
| 3,941,004 | 3/1976 | Kraus | 74/206 |
| 3,945,270 | 3/1976 | Nelson et al. | 74/206 X |
| 4,052,915 | 10/1977 | Kraus | 74/798 |
| 4,157,668 | 6/1979 | Fukuma et al. | 74/202 X |
| 4,224,840 | 9/1980 | Kraus | 74/206 X |
| 4,275,610 | 6/1981 | Kraus | 74/198 X |
| 4,296,648 | 10/1981 | Okano et al. | 74/214 X |

FOREIGN PATENT DOCUMENTS 156520  5/1922  United Kingdom ................. 74/798

Primary Examiner—Allan D. Herrmann
Assistant Examiner—Joseph M. Rolnicki
Attorney, Agent, or Firm—Klaus J. Bach

[57] ABSTRACT

In a traction roller transmission having a traction ring, a sun roller arranged within the traction ring in spaced relationship therefrom and traction rollers arranged in the space between, and in engagement with, the sun roller and the traction ring. The sun rollers have shaft sections extending into a carrier where they are resiliently supported by spring means arranged in passages extending essentially normal to a plane receiving the sun roller and traction roller axes and intersecting the traction roller shaft sections.

12 Claims, 3 Drawing Figures

TRACTION ROLLER TRANSMISSION

BACKGROUND OF THE INVENTION

The invention relates to a traction roller transmission with fixed transmission ratio, particularly to a planetary-type traction roller transmission.

Such a transmission includes a traction ring having disposed therein a sun roller and planetary rollers which are arranged in the annular space between, and in engagement with, the sun roller and the traction ring for transmission of motion between the sun roller and the traction ring. As disclosed in the present inventor's earlier U.S. Pat. No. 3,776,051, the sun roller may be so arranged that its axis is parallel to, but spaced from, the axis of the traction ring such that the annular space between the sun roller and the traction ring is of varying width, the traction rollers being so arranged that at least one of them is driven by the reaction forces into a narrowing section of the annular space when a torque is transmitted. Alternatively, as disclosed in the inventor's U.S. Pat. No. 4,275,610 or in U.S. Pat. No. 3,610,060, other means such as expanding sun rollers or compressing traction rings may be provided to cause firm engagement of the traction rollers with the sun roller and the traction ring when a torque is transmitted through the transmission.

In any case, the traction rollers must be guided into parallel alignment with the traction ring and sun roller in order to keep wear and friction losses to a minimum. As a result, the traction rollers need to be supported with some amount of freedom so that they can move freely into proper positions for transmission of torque and for minimum wear and friction. Resilient supports for the rollers however are usually relatively complicated and expensive and, consequently, not suitable for small transmissions.

It is therefore the principal object of the present invention to provide a traction roller transmission having planetary-type traction rollers with a relatively inexpensive support structure that gives the traction rollers the necessary amount of freedom for proper positioning.

It is also an object to provide inexpensive guide means for guiding the traction roller axes into parallel alignment with the sun roller and traction ring axes as permitted by the freedom given to the traction rollers.

SUMMARY OF THE INVENTION

In a traction roller transmission including a traction ring, a sun roller arranged within the traction ring with an annular space between the sun roller and the traction ring and traction rollers disposed in the annular space, and in engagement with, the sun roller and the traction ring, the traction rollers are supported in a carrier by a support structure which provides for limited freedom of movement of the traction rollers. The traction rollers have shaft extensions which project into openings in the carrier and are engaged therein by supports including spring means disposed in passages extending essentially normal to a plane including the axes of the sun roller and the respective traction roller and intersecting the openings receiving the traction roller shaft extensions.

DESCRIPTION OF A PREFERRED EMBODIMENT

Figure 1:
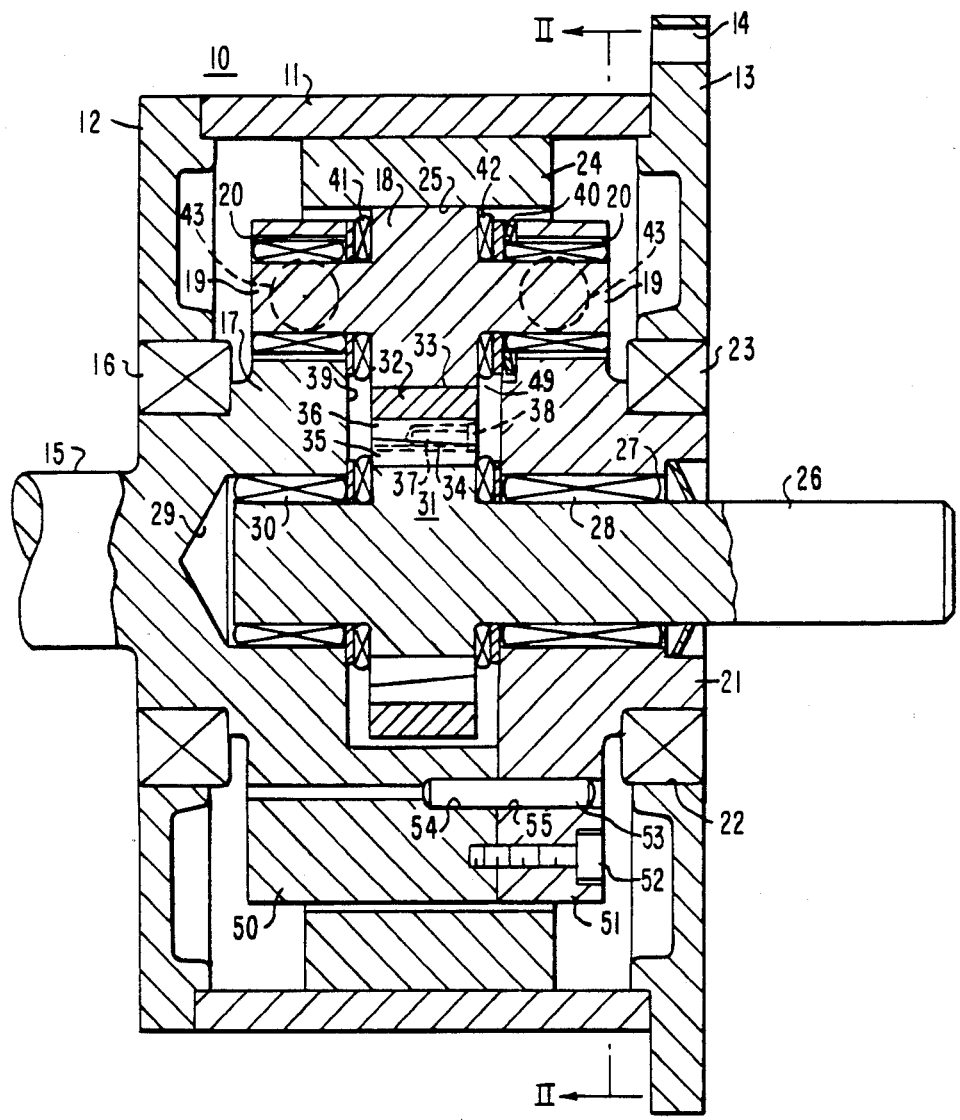
FIG. 1 shows, in axial cross-section, along line I—I of FIG. 2, a planetary-type traction roller transmission which includes the present invention.

The traction roller transmission as shown in FIG. 1 includes a housing 10 having a housing ring 11 interconnecting housing end walls 12 and 13. The end wall 13 has a number of mounting openings 14. An output shaft 15 extends into the housing 10 through a central opening in the end wall 12 where it is supported by a bearing 16. Within the housing 10 the output shaft 15 has a roller carrier 17 which has cavities 49 in which planetary traction rollers 18 are supported on axially projecting shafts 19 which extend into openings 20 in the carrier 17. Preferably the carrier 17 has an axial extension 21 projecting into an opening 22 in the end wall 13 where it is rotatably supported by an end bearing 23.

The housing ring 11 is provided with a housing traction ring 24 having a traction race surface 25 in engagement with the planetary traction rollers 18.

Received within the carrier 17 is the end of an input shaft 26 which extends through an axial opening 27 in the carrier 17, where it is supported by a bearing 28, and into an end bore 29 in the carrier 17 where it is supported by a bearing 30. Within the carrier 17 the input shaft 26 carries a sun roller assembly 31 having a sun roller traction ring 32 provided with a traction surface 33 which is in engagement with the planetary traction rollers 18 for the transmission of motion. To provide for firm engagement of the sun roller traction surface 33 with the planetary traction rollers 18 and of the planetary traction rollers 18 with the traction ring surface 25, the sun roller assembly 31 includes a wedge structure 34 comprising a tapered inner sleeve member 35 and tapered outer sleeve member 36 disposed with its tapered inner surface on the correspondingly tapered outer surface of the tapered inner sleeve member 35. A number of locking bolts 37 extend into axial lock bores 38 at the interface of the sleeve members 35 and 36 such that the sleeves can be locked relative to each other after the sun roller traction ring 32 is sufficiently expanded by forcing the sleeve 36 onto the sleeve 35 to cause firm engagement of the roller traction ring 32 with the planetary rollers 18 and of the planetary traction rollers 18 with the housing traction ring 24. Such locking structures are commercially available as "taper-lock bushings". In order to permit the planetary traction rollers 18 to move into engagement with the housing traction ring 24 they are supported with slight radial freedom of movement. For long transmission life and efficient transmission operation however it is even more important that the planetary traction rollers are so supported that their axes are always perfectly parallel with the axes of the input and output shafts. Accurate guide means are very expensive especially since some amount of freedom of movement must be given to the planetary traction rollers as pointed out earlier. In order to provide for such accurate guiding, one side wall of the carrier 17 adjacent the traction rollers is provided with an accurately machined surface 39 and the rollers are forced toward this accurately machined guide surface 39 by Belleville spring rings 40 disposed between the cage wall and the respective traction roller at its other side. Axial thrust antifriction bearings 41 and 42 are disposed at both sides of each traction roller to minimize friction when the traction rollers 18 are forced by the Belleville spring rings 40 toward the guide surface 39.

To allow the rollers 18 to be guided by the guide surface 39, each traction roller is supported so as to permit slight movement in a direction normal to a plane receiving the axis of the output shaft 15 and the axis of the respective traction roller 18.

Figure 2:
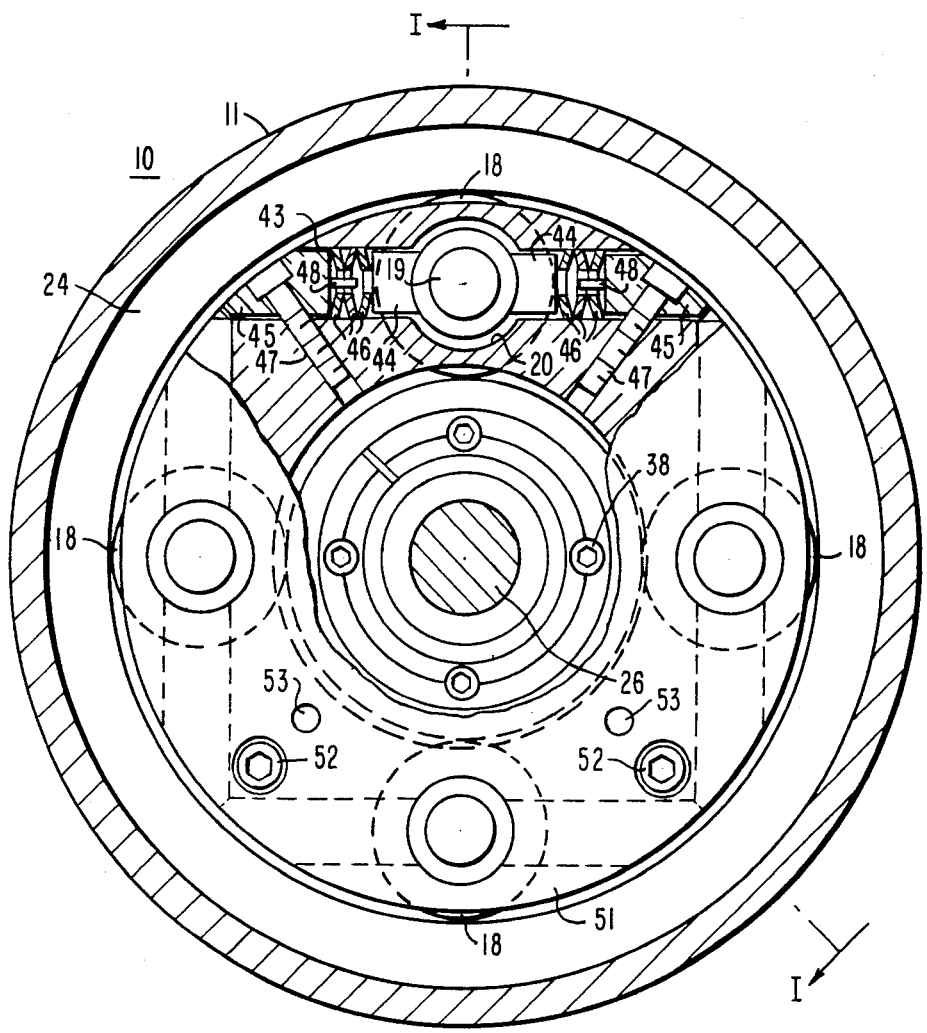
FIG. 2 is a view of the transmission in transverse cross-section along line II—II of FIG. 1 showing the resilient support structure for the traction rollers.

As shown in FIG. 2, the carrier 17 is provided with passages 43, one extending at each side of each traction roller 18 in a direction normal to the plane receiving the axis of the output shaft 15 and the axis of the traction roller and intersecting the traction roller axis, the passages 43 receiving bearing support blocks 44 and anchor blocks 45 with Belleville springs 46 nested therebetween to resiliently position the traction rollers 18. Bolts 47 are provided for the mounting of the anchor blocks 45.

The Belleville springs are relatively stiff and do not permit a large amount of movement but there is no need for a large freedom of movement. Only a small amount of freedom of movement is required for the traction rollers to be able to move into parallel alignment with the sun roller and output shaft axis.

Actually, a relatively rigid spring support structure is preferred since the springs will then be able to accept the reaction forces so that stop members 48 projecting from the anchor blocks 45 are not really needed.

The floating support arrangement for the traction rollers as described above is very simple and very inexpensive yet very effective. The passages are simply bores and the bearing support and anchor blocks are simply bolt-shaped. The Belleville springs are of a size to fit the bores. They are relatively stiff springs which provide relatively firm support yet yield sufficiently to permit position adjustment of the traction rollers.

All sensitive transmission parts are contained within the carrier 17, which consists of a main portion 50 and a cover 51 mounted on the main portion 50 by bolts 52 and fitted by dowel pins 53 disposed in aligned openings 54 and 55 in the main portion 50 and the cover 51. The carrier 17 is closely surrounded by the housing 10 providing for a very small transmission package.

The invention, however, is not limited to the particular transmission design as described and depicted in FIGS. 1 and 2. Other similar transmissions of the type as described, for example, in the present inventor's earlier U.S. Pat. Nos. 3,776,051 or 3,941,004 could be equipped with roller support structures as claimed herein.

Figure 3:
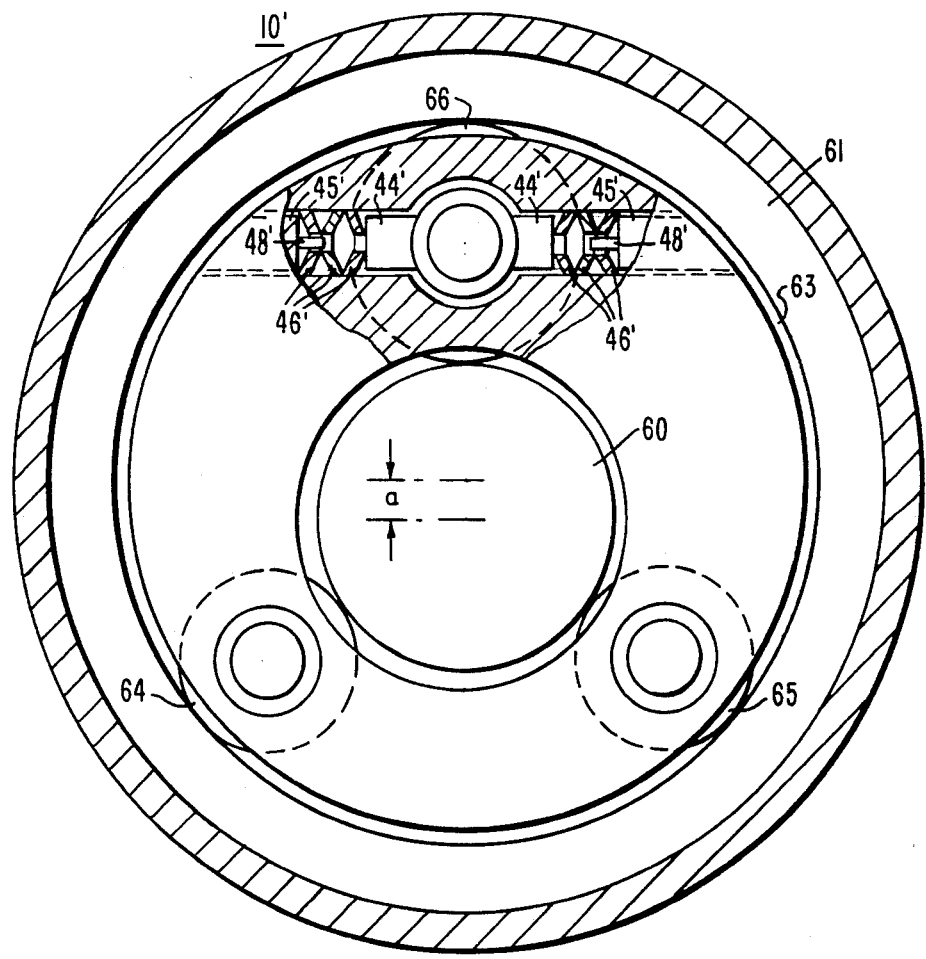
FIG. 3 shows, in cross-section, a wedge-type transmission embodying the present invention.

As shown in FIG. 3 the sun roller 60 is, in this embodiment, displaced from the center of the traction ring 61 by a distance a such that an annular space 63 of varying width is formed between the sun roller and the traction ring. Two traction rollers 64 and 65 are firmly supported in the narrow part of the annular space 63 and a third traction roller 66 is disposed in the widest area of the annular space 63 and is resiliently supported by a support structure as described for rollers 18 in FIGS. 1 and 2. The support structure is schematically shown in FIG. 3 and the same numerals, however primed, are affixed as are in FIGS. 1 and 2 to indicate corresponding parts.

In this type of transmission a torque transmitted between the sun roller and traction ring through the traction roller will generate a reaction force which drives the traction roller 66 into the narrowing annular space thereby causing firm engagement of all the traction rollers with the sun roller and the traction ring.

The support structure for the roller 66 is very simple and provides for sufficient freedom of movement if the manufacturing tolerances are maintained at the desired low values.

I claim:

1. A traction roller transmission comprising: a traction ring having an inner traction race; a sun roller arranged within said traction ring and having a circumferential traction surface spaced from the race of said traction ring so as to form an annular path therebetween; a number of traction rollers disposed in said annular path and being in engagement with said traction ring race and the sun roller surface; said traction rollers being supported in a carrier disposed within said traction ring and having cavities receiving said traction rollers, at least one of said traction rollers having axially projecting shaft sections extending into openings in said carrier, said carrier having passages extending essentially normal to a plane including the axes of the carrier and the respective traction roller and intersecting the openings receiving said shaft sections; and spring means disposed in said passages for resiliently supporting said traction roller.

2. A traction roller transmission as claimed in claim 1, wherein a traction roller support block is slidably received in said passage at least at one side of said axially projecting shaft sections and Belleville springs are disposed in said passage adjacent said roller support block for resiliently supporting said traction roller.

3. A traction roller as claimed in claim 2, wherein anchor blocks are mounted in said passages adjacent said Belleville springs, said anchor blocks forming stop members for said Belleville springs.

4. A traction roller as claimed in claim 3, wherein said passages extend at each side of each projecting shaft section of a traction roller and said support blocks, said Belleville springs and said anchor blocks are disposed in said passages at opposite sides of said projecting traction roller shaft section resiliently supporting said shaft section therebetween.

5. A traction roller transmission as claimed in claim 4, wherein said sun roller is displaced from the center of said traction ring so that an annular space of varying width is formed between said sun roller and said traction ring and a number of traction rollers are disposed in said annular space and in engagement with said sun roller and said traction ring, at least one of said traction rollers which is not arranged in the narrowest part of said annular space having said support blocks, anchor blocks and Belleville springs receiving passages arranged at both sides thereof for permitting said traction roller to be driven, upon transmission of a torque, into the narrowing annular space to cause engagement of the traction rollers with the sun roller and the traction ring.

6. A traction roller as claimed in claim 1 wherein said carrier has a guide structure arranged adjacent one side of said traction roller in a plane normal to the axis of said traction ring and a Belleville spring is disposed between said carrier and said traction roller at the other side thereof for forcing said traction roller into engagement with said guide structure for guiding said traction roller into parallel axial alignment with the axis of said traction ring.

7. A traction roller transmission as claimed in claim 6, wherein axial thrust bearings are arranged at opposite sides of said traction rollers, one between said guide structure and said traction roller and the other between said Belleville spring rings and said traction roller for forcing said traction roller into engagement with said guide structure without generation of friction.

8. A traction roller transmission as claimed in claim 6, wherein said guide structure is a smooth surface area of said cage accurately machined to extend in a plane normal to the axis of the cage.

9. A traction roller transmission as claimed in claim 6, said transmission being received in a housing supporting said traction ring and having input and output shafts, one of said input and output shafts being connected to said sun roller and the other to said carrier.

10. A traction roller transmission as claimed in claim 9, wherein said carrier is rotatably supported in said housing at its axially opposite ends, said carrier having one of said input and output shafts associated therewith at one end and having an opening at the opposite end, the other of said input and output shafts extending through said opening and being rotatably supported therein and carrying said sun roller.

11. A traction roller as claimed in claim 1, wherein said sun roller includes a tapered sleeve supported on a correspondingly tapered support, a sun roller traction ring closely surrounding said tapered sleeve and means for forcing said tapered sleeve onto said tapered support to thereby expand said sun roller traction ring for forcing said traction rollers into firm engagement with the sun roller and the traction ring.

12. A traction roller transmission as claimed in claim 11, wherein said tapered support and sleeve structure is a taper-lock bushing.

* * * * *